(12) United States Patent
Cappello et al.

(10) Patent No.: US 11,189,096 B2
(45) Date of Patent: Nov. 30, 2021

(54) APPARATUS, SYSTEM AND METHOD FOR DATA GENERATION

(71) Applicant: Sony Interactive Entertainment Inc., Tokyo (JP)

(72) Inventors: Fabio Cappello, London (GB); Maurizio Cerrato, London (GB); Rosario Leonardi, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 60 days.

(21) Appl. No.: 16/864,434

(22) Filed: May 1, 2020

(65) Prior Publication Data

US 2020/0349764 A1  Nov. 5, 2020

(30) Foreign Application Priority Data

May 2, 2019  (GB) ..................................... 1906160

(51) Int. Cl.
*G06T 17/20* (2006.01)
*G06K 9/62* (2006.01)

(52) U.S. Cl.
CPC .......... *G06T 17/205* (2013.01); *G06K 9/6256* (2013.01)

(58) Field of Classification Search
None
See application file for complete search history.

(56) References Cited

U.S. PATENT DOCUMENTS

2004/0119711 A1* 6/2004 Wollny ................... G06T 17/20
345/423
2014/0198103 A1* 7/2014 Johansson ............. G06T 17/205
345/420
2016/0335799 A1* 11/2016 Antonini ............... G06T 17/205
2017/0011552 A1* 1/2017 Goldman .............. G06T 17/205
2017/0046874 A1* 2/2017 Mason .................. G06T 17/205

(Continued)

FOREIGN PATENT DOCUMENTS

WO    2019156979 A1    8/2019

OTHER PUBLICATIONS

Chetouani, Aladine. "A 3D mesh quality metric based on features fusion." Electronic Imaging 2017.20 (2017): 4-8. (Year: 2017).*

(Continued)

*Primary Examiner* — Ryan M Gray
(74) *Attorney, Agent, or Firm* — Matthew B. Dernier, Esq.

(57) ABSTRACT

A method of generating a data set includes determining a vertex count of a reference polygonal mesh, generating a second polygonal mesh by adding a predetermined number of vertices to the reference polygonal mesh, comparing a representation of the second polygonal mesh with a representation of the reference polygonal mesh, assigning a first value of a quality parameter to the reference polygonal mesh, and assigning a second value of the quality parameter to the second polygonal mesh based on the comparison of the representations, the value of the quality parameter for a given polygonal mesh indicative of a degree of difference between a representation of the given polygonal mesh and a representation of the reference polygonal mesh, and generating the data set comprising data indicative of a vertex count for the reference and second polygonal meshes and a value of a quality parameters for the reference and second polygonal meshes.

19 Claims, 6 Drawing Sheets

(56) References Cited

U.S. PATENT DOCUMENTS

| | | | | |
|---|---|---|---|---|
| 2017/0091997 | A1* | 3/2017 | Tuffreau | G06T 17/205 |
| 2017/0365069 | A1* | 12/2017 | Dupont | G06T 17/205 |
| 2019/0244423 | A1* | 8/2019 | Brettle | G06T 15/04 |
| 2019/0325647 | A1* | 10/2019 | Suresh | G06T 17/205 |
| 2020/0202624 | A1* | 6/2020 | Szasz | G06T 17/20 |
| 2021/0225077 | A1* | 7/2021 | Ge | G06T 7/75 |

OTHER PUBLICATIONS

Combined Search and Examination Report for corresponding GB Application No. 1906160.5, 4 pages, dated Oct. 22, 2019.
Extended European Search Report for corresponding EP Application No. 20169473.4, 11 pages, dated Oct. 14, 2020.
Alvarez, et al., "A mesh Optimization Algorithm based on Neural Networks" Information Sciences, vol. 177, No. 23, pp. 5347-5364, Sep. 19, 2007.
Bao Han et al., "A Data-Driven Framework for error estimation and mesh-model optimization in System-Level Thermal-Hydraulic Simulation" Nuclear Engineering and Design, vol. 349, pp. 27-45, Apr. 22, 2019.
Roy M., et al., "Generic Attribute Deviation Metric for Assessing Mesh Simplification Algorithm Quality" International Conference on Image Processing, vol. 3, pp. 817-820,Sep. 22, 2002.
K. Vlachkova, et al., "A Comparison of Surface Subdivision Algorithms for Polygonal Meshes" AIP Conference Procedings, pp. 343-350, Jan. 1, 2012.

* cited by examiner

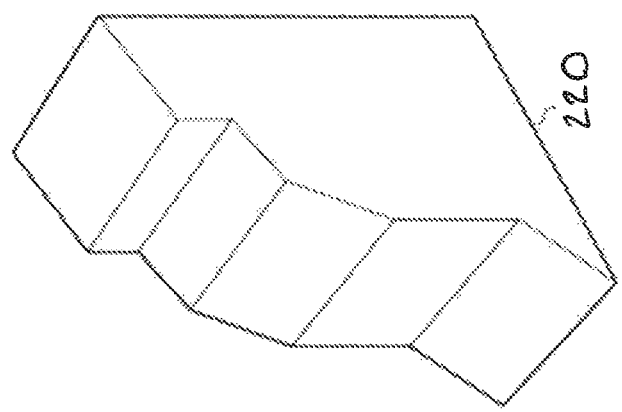
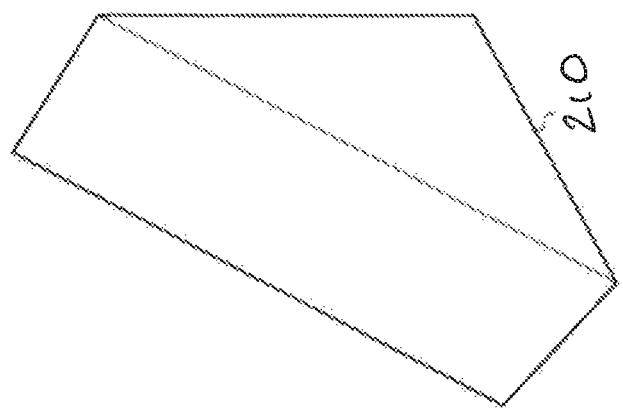
Fig. 2

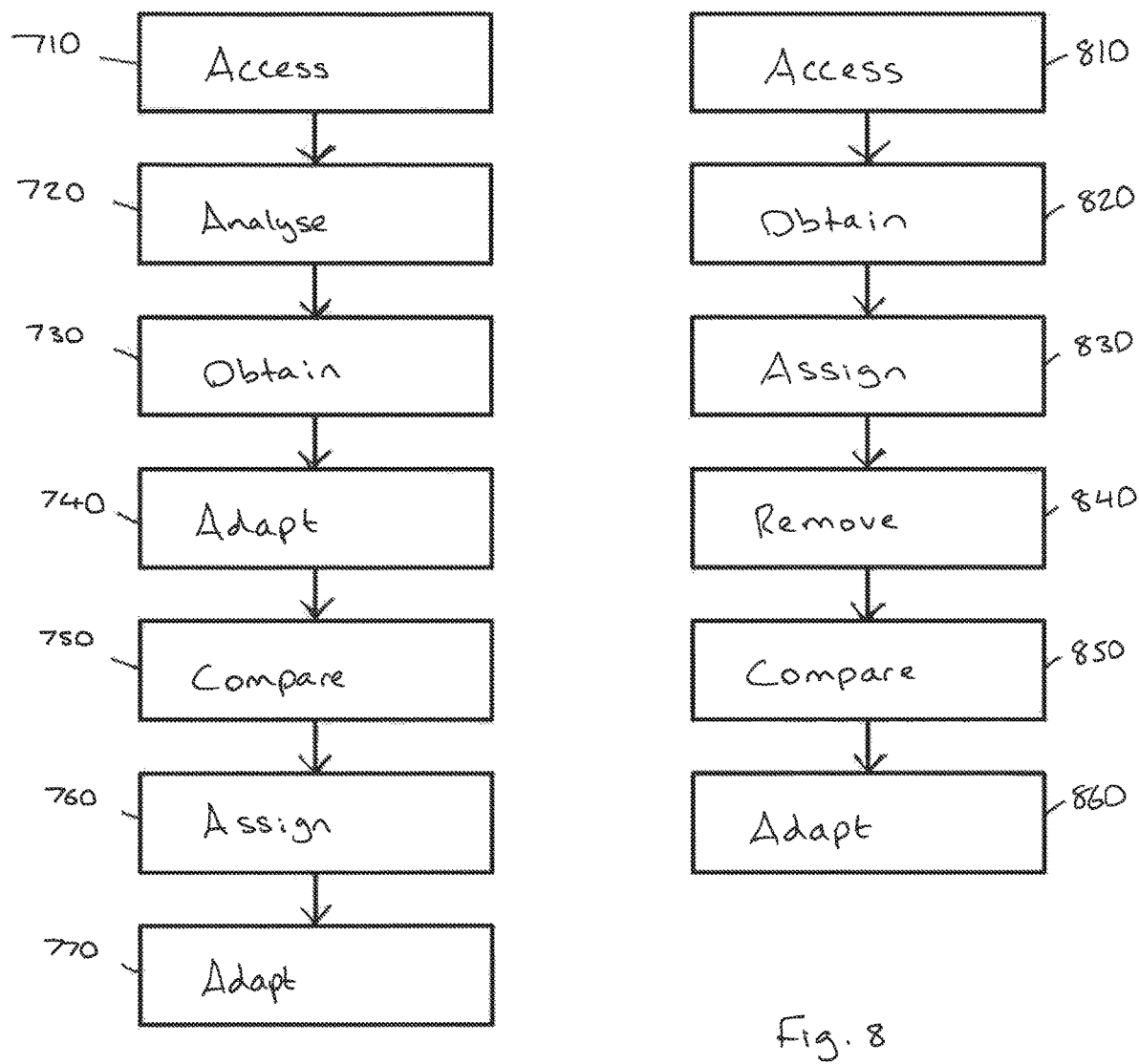

APPARATUS, SYSTEM AND METHOD FOR DATA GENERATION

BACKGROUND OF THE INVENTION

Field of the Invention

The present disclosure relates to an apparatus and method of generating data for computer graphics.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A wide variety of software packages are available for generating polygonal meshes for use in computer-generated graphics. A polygonal mesh typically comprises vertices, edges and faces, where three vertices connected to each other by three edges define a triangle which is the simplest polygon in Euclidean space. A group of polygons which are connected by shared vertices can thus be used to define a surface of an object. Polygonal modelling techniques allow computer-generated objects to be modelled by representing their surfaces as a plurality of polygons. By mapping various textures to the surfaces of the polygons to add surface details, the generation of realistic-looking computer-generated scenes can be achieved.

Although it is possible for a user to construct a polygonal mesh by manually specifying respective vertices, edges and faces, polygonal meshes for use in computer-generated graphics are most commonly generated using software packages that convert volumetric or implicitly represented shapes to meshes. For example, the Marching Cubes algorithm allows a polygonal mesh to be generated from a surface by dividing a cubic volume into smaller cubes and identifying positions of the corners of each cube with respect to a surface. However, using such surface subdivision algorithms can result in mesh structures with large numbers of vertices, edges and faces resulting in a high-level of data redundancy. Due to the high-level of data redundancy, processing of polygonal meshes generated using such surface subdivision algorithms can require significant processing overhead causing such polygonal meshes to be poorly suited for use in real-time applications.

It is therefore desirable to generate data for polygonal meshes for use in rendering computer-generated objects with improved data redundancy.

SUMMARY OF THE INVENTION

It is in this context that the present invention arises.

In one example arrangement, there is provided a method of generating a data set for training a system to generate data of a polygonal mesh by adapting data of an input polygonal mesh, comprising:

obtaining data of a plurality of reference polygonal meshes for use in rendering a content, each reference polygonal mesh comprising a plurality of vertices for representing a surface in the content;

for each reference polygonal mesh:

determining a vertex count of the reference polygonal mesh;

generating a second polygonal mesh by adding a predetermined number of vertices to the reference polygonal mesh;

comparing a representation of the second polygonal mesh with a representation of the reference polygonal mesh;

assigning a first value of a quality parameter to the reference polygonal mesh, and assigning a second value of the quality parameter to the second polygonal mesh based on the comparison of the representations, the value of the quality parameter for a given polygonal mesh indicative of a degree of difference between a representation of the given polygonal mesh and a representation of the reference polygonal mesh; and generating a data set comprising data indicative of the vertex count for the reference and second polygonal meshes and the value of the quality parameters for the reference and second polygonal meshes.

In another example arrangement, there is provided a method of training a system to learn a function for adapting data of an input polygonal mesh to generate data of an output polygonal mesh, comprising:

accessing a training data set comprising, for a reference polygonal mesh and a second polygonal mesh each comprising a plurality of vertices for representing a same surface, data indicative of a vertex count of each of the reference and the second polygonal meshes and a value of a quality parameter for each of the reference and the second polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh, wherein the training data set comprises data of the reference and second polygonal meshes for a plurality of different surfaces;

analysing the data for the second polygonal meshes and the reference polygonal meshes of the training data set to determine a candidate function for removing a plurality of vertices from the second polygonal meshes to generate the reference polygonal meshes;

obtaining data of an input polygonal mesh comprising a first number of polygon surfaces, each polygon surface defined by a plurality of vertices;

adapting the data of the input polygonal mesh by removing a plurality of vertices from the input polygonal mesh according to the candidate function to generate data of an output polygonal mesh;

comparing a representation of the output polygonal mesh with a representation of one or more of the reference polygonal meshes of the training data set;

assigning a value of a quality parameter for the output polygonal mesh based on the comparison of the representations; and adapting the candidate function in dependence upon the value of the quality parameter for the output polygonal mesh.

In another example arrangement, there is provided a method of training a system to learn a function for adapting data of an input polygonal mesh to generate data of an output polygonal mesh, comprising:

accessing a training data set comprising data, for a reference, second and third polygonal mesh each comprising a plurality of vertices for representing a same surface in a content, data indicative of a vertex count for each of the reference, second and third polygonal meshes and a value of a quality parameter for each of the reference, second and third polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh and the vertex count of the reference polygonal mesh being greater than the vertex count of the third polygonal mesh, wherein the training data set comprises data of the reference, second and third polygonal meshes for a plurality of different surfaces;

obtaining data of an input polygonal mesh comprising a first number of polygon surfaces, each polygon surface defined by a plurality of vertices;

assigning a value of the quality parameter for the input polygonal mesh based on a comparison of a representation of the input polygonal mesh with a representation of one or more of the reference polygonal meshes of the training data set;

removing a plurality of vertices from the input polygonal mesh according to a candidate function to generate data of an output polygonal mesh;

comparing a representation of the output polygonal mesh with a representation of the input polygonal mesh and determining a difference between a value of the quality parameter for the output polygonal mesh and the value of the quality parameter for the input polygonal mesh based on the comparison of the representations; and adapting the candidate function for removing the plurality of vertices from the input polygonal mesh in dependence upon the difference in the value of the quality parameter for the output polygonal mesh and the input polygonal mesh.

In another example arrangement, there is provided computer software which, when executed by a computer, causes the computer to carry out the methods discussed above.

In another example arrangement, there is provided an apparatus to generate a data set for training a processor to generate data of a polygonal mesh by adapting data of an input polygonal mesh, comprising circuitry to:

obtain data of a plurality of reference polygonal meshes for use in rendering a content, each reference polygonal mesh comprising a plurality of vertices for representing a surface in the content;

determine a vertex count of each of the reference polygonal meshes;

generate a second polygonal mesh by adding a predetermined number of vertices to the reference polygonal mesh;

compare a representation of the second polygonal mesh with a representation of the reference polygonal mesh;

assign a first value a quality parameter to the reference polygonal mesh and to assign a second value of the quality parameter to the second polygonal mesh based on the comparison of the representations, the value of the quality parameter for a given polygonal mesh indicative of a degree of difference between a representation of the given polygonal mesh and a representation of the reference polygonal mesh; and generate a data set comprising data indicative of the vertex count for the reference and second polygonal meshes and the value of the quality parameters for the reference and second polygonal meshes.

In another example arrangement, there is provided a system configured to learn a function for adapting data of an input polygonal mesh to generate data of an output polygonal mesh, comprising circuitry configured to:

access a training data set comprising, for a reference polygonal mesh and a second polygonal mesh each comprising a plurality of vertices for representing a same surface, data indicative of a vertex count of each of the reference and the second polygonal meshes and a value of a quality parameter for each of the reference and the second polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh, wherein the training data set comprises data of the reference and second polygonal meshes for a plurality of different surfaces;

analyse the data for the second polygonal meshes and the reference polygonal meshes of the training data set to determine a candidate function for removing a plurality of vertices from the second polygonal meshes to generate the reference polygonal meshes;

obtain data of an input polygonal mesh comprising a first number of polygon surfaces, each polygon surface defined by a plurality of vertices;

adapt the data of the input polygonal mesh by removing a plurality of vertices from the input polygonal mesh according to the candidate function to generate data of an output polygonal mesh;

compare a representation of the output polygonal mesh with a representation of one or more of the reference polygonal meshes of the training data set;

assign a value of a quality parameter for the output polygonal mesh based on the comparison of the representations; and adapt the candidate function in dependence upon the value of the quality parameter for the output polygonal mesh.

In another example arrangement, there is provided a system configured to learn a function for adapting data of an input polygonal mesh to generate data of an output polygonal mesh, comprising circuity configured to:

access a training data set comprising data, for a reference, second and third polygonal mesh each comprising a plurality of vertices for representing a same surface in a content, data indicative of a vertex count for each of the reference, second and third polygonal meshes and a value of a quality parameter for each of the reference, second and third polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh and the vertex count of the reference polygonal mesh being greater than the vertex count of the third polygonal mesh, wherein the training data set comprises data of the reference, second and third polygonal meshes for a plurality of different surfaces;

obtain data of an input polygonal mesh comprising a first number of polygon surfaces, each polygon surface defined by a plurality of vertices;

assign a value of the quality parameter for the input polygonal mesh based on a comparison of a representation of the input polygonal mesh with a representation of one or more of the reference polygonal meshes of the training data set;

remove a plurality of vertices from the input polygonal mesh according to a candidate function to generate data of an output polygonal mesh;

compare a representation of the output polygonal mesh with a representation of the input polygonal mesh and determining a difference between a value of the quality parameter for the output polygonal mesh and the value of the quality parameter for the input polygonal mesh based on the comparison of the representations; and adapt the candidate function for removing the plurality of vertices from the input polygonal mesh in dependence upon the difference in the value of the quality parameter for the output polygonal mesh and the input polygonal mesh.

Various other aspects and features of the present disclosure are defined in the appended claims and within the text of the accompanying description.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, in which:

FIG. 1b is a schematic diagram illustrating an approximation of the two-dimensional shape of FIG. 1a;

FIG. 2 is a schematic diagram illustrating high and low quality representations of an object;

FIG. 7 is a schematic flowchart illustrating a method of training a system to learn a function for adapting data of an input polygonal mesh to generate data of an output polygonal mesh;

FIG. 8 is a schematic flowchart illustrating another method of training a system to learn a function for adapting data of an input polygonal mesh to generate data of an output polygonal mesh;

DESCRIPTION OF THE EMBODIMENTS

Figure 1A:
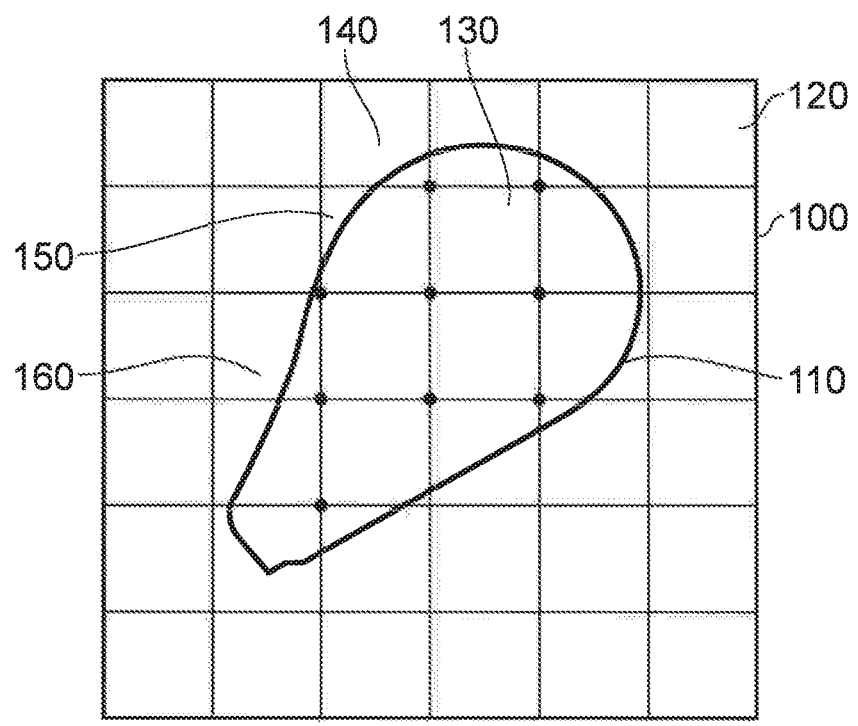
FIG. 1a is a schematic diagram illustrating a two-dimensional shape.

For clarity of illustration, elements illustrated in the figures have not necessarily been drawn to scale. Further, where considered appropriate, reference numerals have been repeated among the figures to indicate corresponding or analogous elements.

The terms "coupled" and "connected," along with their derivatives, may be used herein to describe structural relationships between components of the system for performing the operations herein. It should be understood that these terms are not intended as synonyms for each other. Rather, in particular embodiments, "connected" is used to indicate that two or more elements are in direct physical or electrical contact with each other while "coupled" is used to indicate two or more elements are in either direct or indirect (with other intervening elements between them) physical or electrical contact with each other, and/or that the two or more elements co-operate or communicate with each other (e.g., as in a cause an effect relationship).

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

The present disclosure relates to generating data for use in rendering computer-generated objects.

Referring now to the drawings, wherein like reference numerals designate identical or corresponding parts throughout the several views, FIG. 1a schematically illustrates an example of an algorithm used for generating data of a polygonal mesh for representing a surface of an object, for the purposes of providing background information. The example shown provides an example of a two-dimensional Marching Squares algorithm however it will be appreciated that a three-dimensional Marching Cubes algorithm can be implemented in a similar manner.

FIG. 1a shows a shape 110, which is intended for display, on a grid 100 of squares. The shape 110 may be stored as a two-dimensional scalar field, for example, or as a mathematical function that describes the shape of the perimeter.

In a first step, it is detected whether the vertices of each of the squares in the grid 100 are within the shape or outside of it. Those vertices that are within the shape 110 are identified with black circles in FIG. 1a. This detection may be performed by defining a function or set of coordinates that define the perimeter of the shape 110, and then comparing the coordinates of each vertex with the perimeter information. Any vertex that has coordinates that lie within the shape 110 may be identified as such.

In FIG. 1a, a square 120 is shown as an example of a square in which no corner falls within the boundary of the shape 110. The square 120 is generally not of interest when generating an image, as it is empty of any surfaces and thus does not contribute to the generated shape.

A square 130 illustrates the converse case; the square 130 has four corners that are each within the boundary of the shape 110. The square 130 is therefore also not generally of interest when rendering an image, as no surfaces pass through it.

The square 140 is shown as an example of a square with a single corner that appears within the boundary of the shape 110. It is therefore assumed that only a small portion of the shape 110 is present within the square 140, as if there were a greater amount of the shape 110 in the square 140 then it would be likely that more of the corners of the square 140 would be within the boundary of the shape.

The square 150 is shown as an example of a square with three corners that each appear within the boundary of the shape 110. In such a square, it is assumed that a large portion of the square 150 is within the boundary of the shape 110.

The square 160 is shown as an example of a square with two corners that each appear within the boundary of the shape 110. In this case, the two corners that lie within the boundary of the shape 110 are joined by a shared side of the square 160; it may be possible that in other examples the corners that lie within the boundary of the shape 110 are arranged opposite one another.

Figure 1B:
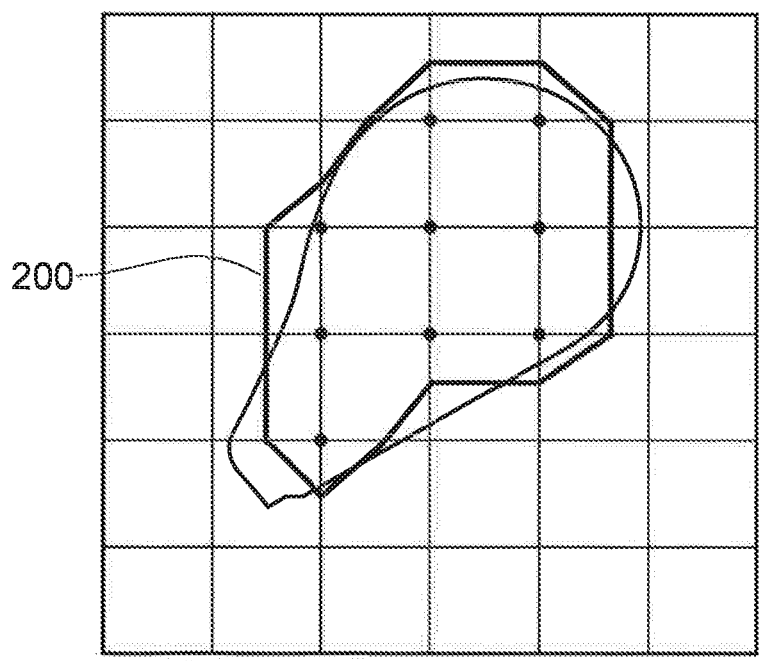

In a next step, an approximation 200 of the shape 110 is drawn based upon the information derived about the squares, as illustrated in FIG. 1b.

The approximation 200 shown in FIG. 1B is a rather rough approximation of the shape 110; one reason for this is that there is little consideration of how the boundary of the shape 110 varies within each square.

A more accurate representation of the shape may be acquired using a more complex implementation of this algorithm; for example, linear interpolation may be used to acquire a more accurate intersection point of the side of a square (rather than simply selecting the midpoint each time). Alternatively, or in addition, post-processing may be applied to the generated approximation 200 so as to smooth the edges and reduce the blockiness of the image that is displayed to a viewer.

The Marching Cubes algorithm may be considered to be a three-dimensional extension of the marching squares algorithm, and as such is useful for generating three-dimensional surfaces for display. Rather than using a grid of squares as the basis of the image generation, a mesh of cubes is used. Each of the vertices of each cube are categorised in a similar manner to those of the vertices of the squares in the marching squares algorithm. This leads to 256 possible planar cubes (i.e. surfaces that intersect a cube) being defined, as each of the eight vertices may or may not be within the volume of the shape being approximated.

The Marching Cubes algorithm may be applied to a three-dimensional scalar field, for example, or a set of voxels that are used to define a shape. Rendering from these representations directly may be problematic in some cases, as they are often large data sets and thus the processing required to generate an image for display may be prohibitively slow.

Therefore, the present disclosure relates to the use of machine learning for processing polygonal mesh data generated by algorithms, such as the Marching Squares algorithm, the Marching Cubes algorithm or other similar algorithms, to improve data redundancy. Moreover, the present disclosure relates to machine learning techniques for learning functions for simplifying structures of overly complex polygonal meshes to generate polygonal meshes having a lower level of vertex redundancy whilst controlling a level of detail of a visual representation of the generated polygonal meshes.

FIG. 2 schematically illustrates an example of using different polygonal meshes for representing a surface of a same object at different levels of quality.

The object 220 corresponds to a higher-quality representation, and comprises a number of different surfaces that give the object 220 a relatively complex shape. The object 210 corresponds to a lower-quality representation of the object. It is clear that this is a lower-quality representation because much of the detail of the higher-quality object 220 is lost; instead of the complex shape of the slope, a single line is provided that links the corners.

The properties of the polygonal mesh used to represent the object 210 provide a lower-quality representation of the surface of the object, whereas the properties of the polygonal mesh used to represent the object 220 provide a higher-quality representation of the surface of the object. The polygonal mesh providing the higher-quality representation comprises a larger number of vertices (higher vertex count) than the polygonal mesh used for providing the lower-quality representation of the surface.

The polygonal mesh providing the higher-quality representation may be generated by a surface subdivision algorithm which results in a large number of vertices and surfaces. Hence, the polygonal mesh has a high-level of detail and provides a faithful representation of the surface of the object (high degree of exactness between the true representation of the surface of the object and the representation of the polygonal mesh). Instead, the polygonal mesh providing the lower-quality representation may be generated by a different surface subdivision algorithm resulting in a smaller number of vertices and a smaller number of surfaces thus providing a more simplified polygonal mesh structure. Alternatively, the polygonal mesh providing the lower-quality representation may have been generated using an mesh simplification algorithm to simplify a structure of the high-quality polygonal mesh used for representing the surface of the object 220 with a high-level of detail.

As such, FIG. 2 provides an example of using two different polygonal meshes to represent a surface of an object with different levels of detail. The polygonal mesh for providing the higher-quality representation of the object 220 comprises a larger number of vertices and requires more processing when rendering the object, whereas the polygonal mesh providing the lower-quality representation of the object 210 comprises a smaller number of vertices and can be processed with reduced latency.

There is a correspondence between a number of vertices of a polygonal mesh and a level of detail of the polygonal mesh. However, a polygonal mesh with a smaller number of vertices is desirable as the processing overhead associated with the polygonal mesh is reduced. A range of mesh simplification algorithms can be used for simplifying a structure of a polygonal mesh by approximating a given input mesh with a less complex mesh, however, such simplification techniques often result in an over simplification of the structure of the mesh resulting in a poor degree of match between the simplified mesh and the input mesh.

FIGS. 3a, 3b, 4a and 4b schematically illustrate examples of simplifying a structure of a polygonal mesh. Mesh simplification strategies can broadly be grouped according to two categories: local strategies that iteratively apply a local operator; and global strategies that are applied to the mesh as a whole. For example, some local iterative algorithms allow properties, such as a total number of surfaces or an error associated with a given vertex, to be specified for a target mesh so that the algorithm can adjust an input mesh until the input mesh has the properties of the specified target mesh. Simplification of a polygonal mesh can be implemented using vertex-removal techniques and edge-collapse techniques to provide a simplified mesh having a smaller number of vertices and faces than the input mesh.

Figure 3B:
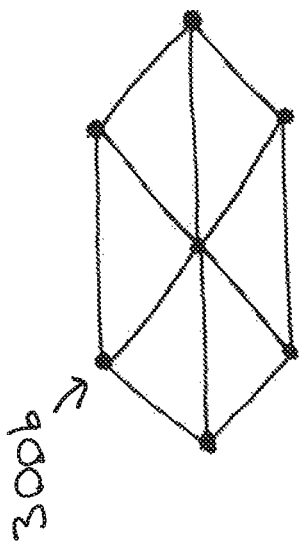
FIGS. 3a and 3b are schematic diagrams illustrating an edge collapsing technique.
Figure 3A:
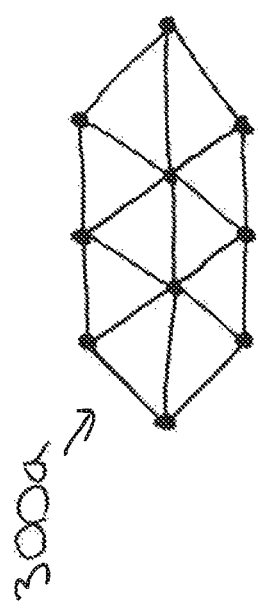

In FIGS. 3a and 3b an example input polygonal mesh 300a is shown comprising ten vertices and ten triangular faces. The input polygonal mesh 300a is simplified by performing an edge-collapse operation that collapses an edge connecting two vertices and updating the previous edges that were previously incident upon the collapsed edge. The output polygonal mesh 300b thus has fewer vertices and fewer faces than the input polygonal mesh 300a and represents a simplification of the input polygonal mesh 300a.

Figure 4B:
FIGS. 4a and 4b are schematic diagrams illustrating vertex culling.
Figure 4A:
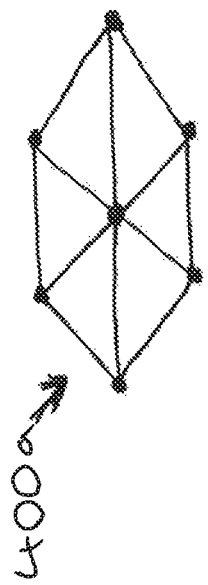

In FIGS. 4a and 4b an example input polygonal mesh 300a is shown comprising seven vertices and six triangular faces. The input polygonal mesh 400a is simplified by performing a vertex decimation operation that removes a single vertex and updates the polygonal mesh by re-triangulating the polygonal mesh. In this case the output polygonal mesh 400b thus has fewer vertices and fewer faces than the input polygonal mesh 300a and represents a simplification of the input polygonal mesh 300a.

Hence more generally, the techniques illustrated in FIGS. 3a, 3b, 4a and 4b can be performed for an input polygonal mesh to generate data of an output polygonal mesh having a reduced number of vertices and faces.

However, over simplification of polygonal meshes using such techniques can result in a loss of detail such that the polygonal mesh fails to provide a faithful representation of the surface (mesh simplification operation introduces an error) represented by the original non-simplified polygonal mesh. The present disclosure also realises that polygonal meshes generated by surface subdivision algorithms can often have a high level of data redundancy such that removal of vertices from the polygonal mesh can initially be performed without significant loss of detail. The present disclosure provides a method of generating a data set for training a system to generate data of a polygonal mesh by adapting data of an input polygonal mesh.

Figure 5:
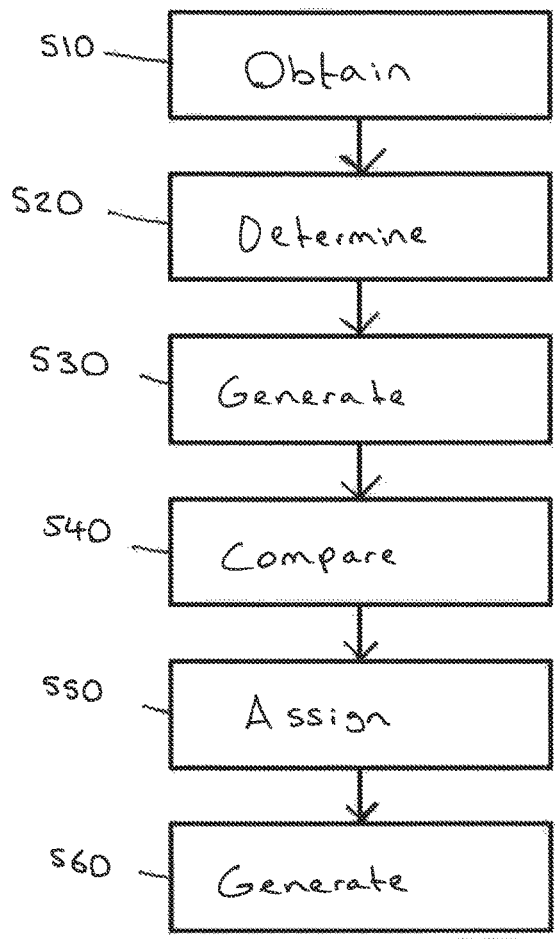
FIG. 5 is a schematic flowchart illustrating a method of generating a data set for training a system.

Referring now to FIG. 5, in embodiments of the present disclosure a method of generating a data set for training a system to generate data of a polygonal mesh by adapting data of an input polygonal mesh, comprises:

obtaining data (at a step 510) of a plurality of reference polygonal meshes for use in rendering a content, each reference polygonal mesh comprising a plurality of vertices for representing a surface in the content;

for each reference polygonal mesh:
determining (at a step 520) a vertex count of the reference polygonal mesh;
generating (at a step 530) a second polygonal mesh by adding a predetermined number of vertices to the reference polygonal mesh;
comparing (at a step 540) a representation of the second polygonal mesh with a representation of the reference polygonal mesh;
assigning (at a step 550) a first value of a quality parameter to the reference polygonal mesh, and assigning a second value of the quality parameter to the second polygonal mesh based on the comparison of the representations, the value of the quality parameter for a given polygonal mesh indicative of a degree of difference between a representation of the given polygonal mesh and a representation of the reference polygonal mesh; and
generating (at a step 560) a data set comprising data indicative of the vertex count for the reference and second polygonal meshes and the value of the quality parameters for the reference and second polygonal meshes.

Polygonal meshes used for rendering content such as a video game or other interactive content can provide a source of high quality meshes having a low-level of vertex redundancy. The data from such polygonal meshes can be used to provide examples of meshes having a desirable level of quality (good fidelity of representation) and a desirable level of vertex redundancy and such polygonal meshes can thus be used as reference polygonal meshes for generating a training data set.

For example, a video game may comprise data of a plurality of polygonal meshes for use in rendering a range of different graphical objects in a scene. Data of these polygonal meshes can be acquired, for use in generating a data set for machine learning purposes, in order to provide examples of polygonal meshes having optimal properties.

Therefore, data of a plurality of reference polygonal meshes can be obtained at the step 510, where the data comprises data of polygonal meshes used for rendering a predetermined content. In this way, the plurality of reference polygonal meshes can be used to generate the data set for training the system. Each reference polygonal mesh comprises a plurality of vertices for representing a surface in the content, where one of the reference polygonal meshes may be used to represent a surface of a first type of object (e.g. an avatar, a car or a chair) and another reference polygonal mesh may be used to represent a surface of a second type of object.

A representation of a reference polygonal mesh thus has an exact correspondence with a representation of a polygonal mesh used to render the content (each polygonal reference mesh is obtained from the content without having been modified). In other words, for a given reference polygonal mesh corresponding to a given object in the content, a visual representation of the reference polygonal mesh is the same as a visual representation of the surface of the object in the content, in the sense that the two representations correspond to the same object and have the same level of detail.

The quality parameter is a metric providing an indication of a degree of difference between a representation of a given polygonal mesh with respect to its corresponding reference polygonal mesh. Therefore, the quality parameter is an appearance-based metric that is indicative of an amount of spatial deviation between a visual representation of a polygonal mesh and a visual representation of the reference polygonal mesh. Since each polygonal reference mesh is obtained from the content without having been modified, each polygonal reference mesh has the same level of detail as the representation of the content and thus provides a faithful representation of the content. For example, each polygonal reference mesh may be assigned a value (e.g. 1) which indicates that the level of quality of the mesh is the same as the level of quality of the rendered content. Therefore, when a polygonal reference mesh is adapted using techniques such as those illustrated in FIGS. 3a, 3b, 4a and 4b, the resultant polygonal mesh can be compared with its reference polygonal mesh and assigned a value of the quality parameter based on the spatial deviation between the two meshes to provide an indication of a deterioration in the quality level, if any, for the resultant polygonal mesh. A visual representation of the two polygonal meshes can be compared with each other and a sum of the squared differences of the surface positions of the two representations can be calculated, where a large value for the sum of the squared difference indicates a large spatial deviation and a small value for the sum of the squared difference indicates a small spatial deviation. Therefore, at the step 520 each polygonal reference mesh can be assigned a value for the quality parameter indicating that the reference polygonal mesh has a level of quality that is the same as the level of quality of the content from which it was obtained.

At the step 520 a vertex count can be determined for each of the plurality of reference polygonal meshes. In this way, the total number of vertices can be determined for each reference polygonal mesh and data indicative of the vertex count for each reference polygonal mesh can be generated for the training data set. The vertex count may indicate a total number of vertices included in a given polygonal mesh or a vertex density associated with the polygonal mesh such as a number of vertices per unit area.

At the step 530, a second polygonal mesh is generated by adding a predetermined number of vertices to the reference polygonal mesh. In this way, additional vertices can be incorporated into the structure of each reference polygonal mesh in order to adapt each reference polygonal mesh. As discussed previously, a reference polygonal mesh has a good level of detail and a low-level of vertex redundancy. As such, by generating the second polygonal mesh by introducing extra vertices into the mesh structure, the second polygonal mesh will have a higher-level of vertex redundancy with little or no change in the level of detail of the polygonal mesh. For example, applying the Catmull-Clark surface subdivision algorithm for a reference polygonal mesh allows the surface of the reference polygonal mesh to be further smoothed by dividing the surface into smaller and smaller polygons, which thereby includes additional redundant vertices in the mesh.

In this way, a second polygonal mesh can be generated for each reference polygonal mesh, where the reference polygonal mesh has a high-level of quality and a low-level of vertex redundancy and the second polygonal mesh has a high-level of quality and a high-level of vertex redundancy. In other words, the reference polygonal mesh and the second polygonal mesh are of substantially the same level of quality but with different levels of vertex redundancy. The data generated for each second polygonal mesh therefore corresponds to a ground truth for a polygonal mesh having a high-level of vertex redundancy and a high-level of quality, whereas the data generated for the reference polygonal mesh corresponds to a ground truth for a polygonal mesh having a low-level of vertex redundancy and a high-level of quality.

At the step 540, a representation of the second polygonal mesh is compared with a representation of the reference polygonal mesh from which the second polygonal mesh was generated. Visual representations of the second polygonal mesh and the reference polygonal mesh can be compared with each other to determine a degree difference between the representations which arises due to the additional vertices present in the second polygonal mesh.

At the step 550, a first value of a quality parameter is assigned to the reference polygonal mesh and a second value of the quality parameter is assigned to the second polygonal mesh based on the comparison of the representations to provide an indication of a degree of difference between the representations. Since the reference polygonal mesh is an exact copy of a polygonal mesh used by a content for rendering a surface of an object, a value of the quality parameter can be assigned to the reference polygonal mesh indicating that the reference polygonal mesh has optimal quality. As such, the value of the quality parameter assigned to the second polygonal mesh can be used to provide an indication of the level of detail of the second polygonal mesh in comparison to the level of detail of its reference polygonal mesh. Since the reference polygonal mesh has a high-level of detail, the additional vertices present in the second polygonal mesh provide little or no change in the level of detail and therefore the second polygonal mesh is assigned a value for the quality parameter that is substantially the same as the value of the quality parameter assigned to the reference polygonal mesh.

At the step 560, the training data set is generated to comprise data indicative of: the vertex count for the reference polygonal mesh and the second polygonal mesh; and the value of the quality parameters for the reference polygonal mesh and the second polygonal meshes. The training data set thus comprises data for a plurality of reference polygonal meshes and a plurality of second polygonal meshes, where the data for each reference polygonal mesh is stored in association with the data for its corresponding second polygonal mesh. As such, the data set comprises a plurality of input-output examples for use in training a system to learn a function for adapting an input polygonal mesh having properties similar to the second polygonal meshes to generate an output polygonal mesh having properties similar to the reference polygonal meshes.

The second polygonal meshes therefore provide examples of high-quality meshes with a high-level of data redundancy and for each second polygonal mesh the data set includes a corresponding high-quality mesh with a low-level of data redundancy. Using this data set, the system can be trained to learn relationships between the second polygonal meshes and the reference polygonal meshes. Using the relationships between the polygonal meshes, a function can be defined for adapting an input polygonal mesh having a high-quality and a high-level of data redundancy to generate an output mesh having properties similar to the reference polygonal meshes.

Using mesh simplification algorithms employing mesh decimation techniques such as those illustrated in FIGS. 3a, 3b, 4a and 4b, data indicating properties of an input polygonal mesh (polygonal mesh having properties similar to the second polygonal meshes), and data indicating properties of a target polygonal mesh having properties similar to the reference polygonal meshes, a function can be defined for adapting an input polygonal mesh.

Figure 6:
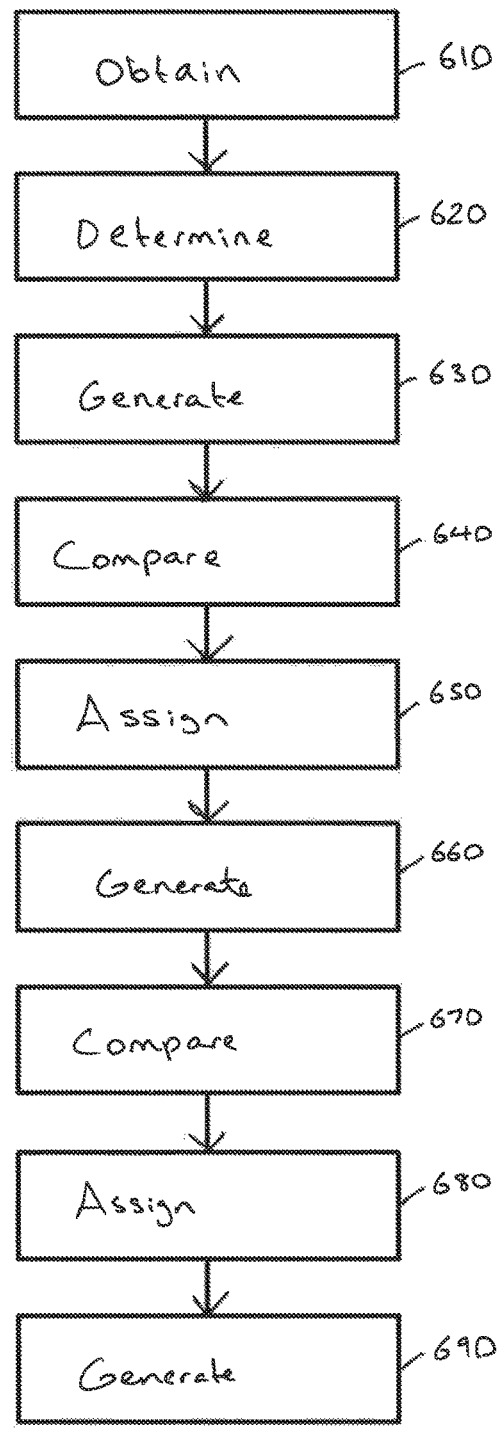
FIG. 6 is a schematic flowchart illustrating another method of generating a data set for training a system.

Referring now to FIG. 6, in embodiments of the present disclosure a method of generating a data set for training a system to generate data of a polygonal mesh by adapting data of an input polygonal mesh, comprises:

obtaining data (at a step 610) of a plurality of reference polygonal meshes for use in rendering a content, each reference polygonal mesh comprising a plurality of vertices for representing a surface in the content;

for each reference polygonal mesh:

determining (at a step 620) a vertex count of the reference polygonal mesh;

generating (at a step 630) a second polygonal mesh by adding a predetermined number of vertices to the reference polygonal mesh;

comparing (at a step 640) a representation of the second polygonal mesh with a representation of the reference polygonal mesh;

assigning (at a step 650) a first value of a quality parameter to the reference polygonal mesh, and assigning a second value of the quality parameter to the second polygonal mesh based on the comparison of the representations, the value of the quality parameter for a given polygonal mesh indicative of a degree of difference between a representation of the given polygonal mesh and a representation of the reference polygonal mesh;

generating (at a step 660) a third polygonal mesh by removing a predetermined number of vertices from the reference polygonal mesh;

comparing (at a step 670) a representation of the third polygonal mesh with the representation of the reference polygonal mesh;

assigning (at a step 680) a third value of the quality parameter to the third polygonal mesh based on the comparison of the representations; and generating (at a step 690) a data set comprising data indicative of the vertex count for the reference, second and third polygonal meshes and the value of the quality parameters for the reference, second and third polygonal meshes.

In embodiments of the disclosure the data set for training the system to generate data of a polygonal mesh by adapting data of an input polygonal mesh can be generated according to the steps illustrated in FIG. 6. In this way, a second polygonal mesh and a third polygonal mesh can be generated for each reference polygonal mesh, where the second polygonal mesh (high-quality mesh with high vertex redundancy) is generated by adding a plurality of vertices to the reference polygonal mesh and the third polygonal mesh (low-quality over-simplified mesh) is generated by removing a plurality of vertices from the reference polygonal mesh. Therefore, for each reference polygonal mesh there is a corresponding second polygonal mesh and a corresponding third polygonal mesh; the reference polygonal mesh providing an example of a mesh having desirable properties, and the second polygonal mesh and third polygonal mesh providing examples of an overly redundant version of the reference polygonal mesh and an overly simplified version of the reference polygonal mesh, respectively.

Whereas the second polygonal mesh is generated by adding vertices to the reference polygonal mesh using an algorithm such as the Catmull-Clark surface subdivision algorithm, the third polygonal mesh is generated by removing vertices from the reference polygonal mesh using a mesh simplification algorithm that generates an approximated version of the reference polygonal mesh by removing vertices based on vertex culling and edge collapsing techniques.

By taking a reference polygonal mesh, which is suitable for use in rendering content such as a video game, and removing vertices from the mesh structure, the resulting polygonal mesh will have less detail with respect to the reference polygonal mesh and will thus provide a visually undesirable representation. For example, in the case where the reference polygonal mesh provides a high-quality representation of an object such as a tree, the corresponding third polygonal mesh will have fewer vertices and fewer faces for representing the tree and thus much of the detail of the tree provided by the higher-quality reference polygonal mesh will be lost.

In addition to comparing the representation of the reference polygonal mesh with the representation of its second polygonal mesh and assigning a value of the quality parameter for the second polygonal mesh based on the comparison, the representation of the reference polygonal mesh is also compared with the representation of its third polygonal mesh and a value of the quality parameter is assigned for the third polygonal mesh based on the comparison. For example, in a simplest a case a value of 1 for the quality parameter may be assigned for the reference polygonal mesh, a value of approximately 1 for the quality parameter may be assigned for the second polygonal mesh based on the comparison of the second polygonal mesh with the reference polygonal mesh, and a value of less than 1 (e.g. 0.7 for a simplified mesh or 0.4 for a more simplified mesh structure) may be assigned for the quality parameter for the third polygonal mesh based on the comparison of the reference and third polygonal meshes, where the magnitude of the value of the quality parameter indicates a degree of difference between the reference polygonal mesh and the second or third polygonal mesh.

Therefore, the data set can be generated at the step 690 to comprise: data for reference polygonal meshes which correspond to a ground truth for a polygonal mesh having a low vertex redundancy and high-quality representation; data for second polygonal meshes which correspond to a ground truth for a polygonal mesh having high vertex redundancy and high-quality representation; and data for third polygonal meshes which correspond to a ground truth for a polygonal mesh having low vertex redundancy and low-quality representation.

Using this data set, the system can be trained to learn relationships between the second polygonal meshes and the reference polygonal meshes. Using the relationships between the polygonal meshes, a function can be defined for adapting an input polygonal mesh having a high-quality and a high-level of data redundancy (i.e. an input mesh that has properties similar to the second polygonal meshes of the data set) to generate an output mesh having properties similar to the reference polygonal meshes. In addition, by providing examples of overly simplified mesh structures (third polygonal meshes) as part of the data set, the system can be trained to learn relationships between the second polygonal meshes and the reference polygonal meshes in a manner that a function can be defined that does not result in over simplification of a mesh structure of an input polygonal mesh. In other words, by providing, for each reference polygonal mesh, an example of an overly simplified mesh the system can be trained to learn a function that adapts data of an input polygonal mesh (polygonal mesh having properties similar to the second polygonal meshes) to generate data of a target polygonal mesh having properties similar to the reference polygonal meshes while ensuring that the function does not result in over simplification which would result in generating a mesh having properties similar to the third polygonal meshes.

Referring now to FIG. 7, in embodiments of the disclosure a method of training a system to learn a function for adapting data of an input polygonal mesh to generate data of an output polygonal mesh, comprises:

accessing (at a step 710) a training data set comprising, for a reference polygonal mesh and a second polygonal mesh each comprising a plurality of vertices for representing a same surface, data indicative of a vertex count of each of the reference and the second polygonal meshes and a value of a quality parameter for each of the reference and the second polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh, wherein the training data set comprises data of the reference and second polygonal meshes for a plurality of different surfaces;

analysing (at a step 720) the data for the second polygonal meshes and the reference polygonal meshes of the training data set to determine a candidate function for removing a plurality of vertices from the second polygonal meshes to generate the reference polygonal meshes;

obtaining data (at a step 730) of an input polygonal mesh comprising a first number of polygon surfaces, each polygon surface defined by a plurality of vertices;

adapting (at a step 740) the data of the input polygonal mesh by removing a plurality of vertices from the input polygonal mesh according to the candidate function to generate data of an output polygonal mesh;

comparing (at a step 750) a representation of the output polygonal mesh with a representation of one or more of the reference polygonal meshes of the training data set;

assigning (at a step 760) a value of a quality parameter for the output polygonal mesh based on the comparison of the representations; and adapting (at a step 770) the candidate function in dependence upon the value of the quality parameter for the output polygonal mesh.

In embodiments of the disclosure a system is trained to learn a function for adapting data of an input polygonal mesh to generate data of an output polygonal mesh according to the steps illustrated in FIG. 7. Using a data set generated according to the steps illustrated in FIG. 6, the system can be trained to learn the function by analysing examples of reference polygonal meshes and their corresponding second polygonal meshes. In this way, an initial candidate function for adapting an input polygonal mesh to generate an output polygonal mesh having certain target properties corresponding to the properties of the reference polygonal meshes can be determined by analysing the training data set.

The reference polygonal meshes of the training data set can thus be used to define a target polygonal mesh having desirable properties (high-quality and low vertex redundancy). The candidate function comprises parameters for mesh simplification and one or more parameters governing the degree to which the mesh simplification algorithm is applied to a given mesh. The candidate function therefore allows an input polygonal mesh to be simplified and the system can learn a degree of simplification to apply to a given input polygonal mesh to generate an output polygonal mesh that is similar in structure to the reference polygonal meshes.

At the step 710, the data set comprising examples of input data (second polygonal meshes) and output data (reference polygonal meshes) is accessed and at the step 720 the data set is analysed to determine the candidate function for removing vertices from polygonal meshes having high-quality and a high-level of vertex redundancy to generate data of an adapted polygonal mesh having properties corresponding to reference polygonal mesh properties. Therefore, use of the second polygonal meshes and the reference polygonal meshes as training examples of high quality meshes with different levels of vertex redundancy can allow the system to learn a function for reducing a level of vertex redundancy for a high-quality polygonal mesh whilst preserving the quality of the polygonal mesh.

In a simplest case, the function may comprise parameters for implementing a given mesh simplification algorithm and one or more parameters for determining an extent to which the mesh simplification algorithm is executed so as to simplify an input polygonal mesh to an extent such that the output polygonal mesh has properties of a target mesh as indicated by the training data set.

A wide range of algorithms exist for decimating a polygonal mesh to produce a simplified version that approximates the original polygonal mesh. Examples of such algorithms include: vertex clustering algorithms in which a bounding box is divided into a lattice of squares or cubes and all of the vertices within a given square or cube (cell) are replaced with a single representative vertex and faces that thereby become degenerate are removed from the resulting simplified mesh; and various iterative algorithms (such as the QSlim algorithm, for example) which iteratively applies a collapse operator to replace two vertices with one in a manner similar to the technique in FIGS. 3a and 3b. It will be appreciated that the techniques of the present disclosure can use a range of mesh simplification algorithms to simplify a mesh structure and the system can be trained to learn a function for implementing a given mesh simplification algorithm and controlling a degree (extent) to which the algorithm is applied for a given input polygonal mesh.

At the step 730, data is obtained for an input polygonal mesh comprising a first number of polygon surfaces, where each polygon surface is defined by a plurality of vertices. In some examples, the step 730 may further comprise a step of determining a vertex count for the input polygonal mesh and/or a step of assigning a value of the quality parameter for the input polygonal mesh based on a comparison of a representation of the input polygonal mesh with a representation of one or more of the reference polygonal meshes of the training data set. Hence more generally, data can be obtained for the input polygonal mesh and based on at least one of the vertex count or the value of the quality parameter and indication as to whether the input polygonal mesh corresponds to a high-quality mesh having a high-level of vertex redundancy.

At the step 740, the data for the input polygonal mesh is adapted in accordance with the candidate function so as to generate data for an output polygonal mesh having a second number of polygonal surfaces, wherein the second number of polygonal surfaces is smaller than the first number of polygonal surfaces. The data of the input polygonal mesh can be processed by the system in accordance with the candidate function to generate the output polygonal mesh having a smaller number of vertices. In some examples, the properties of the input polygonal mesh such as vertex count and/or the value of the quality parameter are used to set the one or more parameters of the candidate function based on the properties of the given input polygonal mesh. For example, a first candidate function may be selected for adapting input polygonal meshes having a first vertex count and a second candidate function may be selected for adapting input polygonal meshes having a second vertex count. The first candidate function may be selected for training when the input polygonal mesh has a vertex count falling within a first range (e.g. having a vertex count between X vertices and X+n vertices, where X and n are integer values), whereas the second candidate function may be selected for training when the input polygonal mesh has a vertex count falling within a second range (e.g. having a vertex count between Y vertices and Y+n vertices, where Y and n are integer values). The vertex count may indicate a total number of vertices included in the polygonal mesh or a vertex density associated with the polygonal mesh such as a number of vertices per unit area. In this way, based on the properties of the input polygonal mesh a candidate function can be selected and training for that candidate function can be performed according to the steps illustrated in FIG. 7. Alternatively, the system can be trained to learn a single candidate function, where the candidate function comprises parameters that are adjusted in accordance with the vertex count (or other properties) of the input polygonal mesh such that a single candidate function is learned for processing input polygonal meshes.

At the step 750, a representation of the output polygonal mesh is compared with a representation of one or more of the reference polygonal meshes of the training data set. By comparing the representations in this way, the quality of the output polygonal mesh relative to the quality of the one or more reference polygonal meshes can be evaluated. As discussed previously, visual representations of two respective polygonal meshes can be compared with each other and a sum of the squared differences of the surface positions of the two representations can be calculated. Based on this comparison, a value of the quality parameter can be assigned for the output polygonal mesh at the step 760 to indicate a level of quality for the output polygonal mesh compared to a level of quality of one or more of the reference polygonal meshes.

In the case where the candidate function results in an over simplified output polygonal mesh, the comparison of the representations will indicate a relatively large spatial deviation between the output polygonal mesh and the reference polygonal meshes. Therefore, for the case where the output mesh is an oversimplified mesh, a value for the quality parameter assigned to the output polygonal mesh will be different from the value of the quality parameter for the one or more reference polygonal meshes. For example, assuming that the reference quality meshes each have a value of 1 for the quality parameter, then an overly simplified mesh may be assigned a value of 0.5 (or alternately 1.5) for the quality parameter indicating that the representation of the output polygonal mesh is of lower quality than the reference polygonal meshes. As such, the output polygonal mesh can be assigned a value for the quality parameter where the difference in the value of the quality parameter for the output polygonal mesh and the value of the quality parameter for the one or more reference polygonal meshes is indicative of a difference in quality.

For the case where the candidate function results in an over simplified output polygonal mesh, which is indicated by the value of the quality parameter assigned to output polygonal mesh, the candidate function can subsequently be adapted so that for a given mesh having properties (e.g. vertex count and/or value of quality parameter) similar to the input polygonal mesh the adapted candidate function generates an output polygonal mesh having properties more similar to the properties of the reference polygonal meshes than the output polygonal mesh generated by the initial candidate function. The candidate function is adapted at the step 770 in dependence upon the value of the quality parameter for the output polygonal mesh by changing a value of one or more of the parameters of the candidate function. As discussed previously, the function comprises a plurality of parameters for implementing a given mesh simplification algorithm (mesh simplification parameters) and one or more parameters for determining an extent to which the mesh simplification algorithm is executed. When the value of the quality parameter for the output polygonal mesh indicates that there has been a substantial loss in quality due to the mesh simplification performed in accordance with the candidate function, then the candidate function can be adapted to adjust an extent to which mesh simplification processing is performed. In other words, when the candidate function yields an output polygonal mesh that is overly simplified and thus has a poor level of quality, the candidate function can be adapted to reduce an amount of mesh simplification processing performed by the function.

It will be appreciated that the method steps illustrated in FIG. 7 can be continuously performed to continuously adapt the candidate function in a manner that minimises the difference in the value of the quality parameter for the output polygonal mesh compared to the value of the quality parameter for the one or more reference polygonal meshes. For example, the method illustrated in FIG. 7 can be performed using data of a first input polygonal mesh and the candidate function can be adapted in response to a comparison of a first output polygonal mesh with the one or more reference polygonal meshes, and the method can then be performed again using data of a second input polygonal mesh so that the candidate function can be adapted again in response to a comparison of a second output polygonal mesh with the one or more reference polygonal meshes. In this way, a plurality of different input polygonal meshes can be used to train the system to learn the function by continuously adapting the candidate function.

In the case where the candidate function results in an output polygonal mesh having a reduced number of vertices and the comparison of the representation of the output polygonal mesh with the representations of the one or more reference polygonal meshes indicates that the output polygonal mesh and the input polygonal mesh have a similar level of quality, this indicates that the candidate function did not result in an overly simplified output polygonal mesh. However, even though the candidate function yielded an output polygonal mesh having a desirable level of quality, it is possible that the vertex redundancy of the output polygonal mesh is still greater than that expected for a reference polygonal mesh, which means that the processing overhead associated with processing the output polygonal mesh is still larger than the processing overhead associated with processing of a reference polygonal mesh.

Consequently, in order to train the system to learn a function that will generate data for an output polygonal mesh having properties similar to a reference polygonal mesh there are at least two possible techniques for adjusting the candidate function. The first possibility is where the candidate function is initially set with parameter values so that the function will generate data of an output polygonal mesh that is deliberately over simplified. In this way, the value of the quality parameter for the output polygonal mesh that is initially generated by the candidate function will indicate that the output polygonal mesh is overly simplified and the candidate function can subsequently be adapted so as to reduce the amount of simplification applied to an input polygonal mesh (reduce the number of vertices removed from the input polygonal mesh). Therefore, the candidate function can be gradually adjusted in a manner that gradually improves the quality of the output polygonal mesh until the quality of the output polygonal mesh is substantially the same as the quality of the one or more reference meshes, thus ensuring that the output polygonal mesh has good quality and low vertex redundancy. Alternatively, a second possibility allows the candidate function to be initially set with parameter values that are expected to yield an output polygonal mesh having properties similar to the reference polygonal meshes. In the case that the candidate function results in an output polygonal mesh having a similar level of quality to the input polygonal mesh or the reference polygonal meshes (the reference polygonal meshes and the input polygonal mesh are of high-quality), then the candidate function can be adapted to increase the amount of simplification applied to an input polygonal mesh (increase the number of vertices removed from the input polygonal mesh). In this way, the candidate function can be adapted in a manner that gradually increases the number of vertices removed from an input polygonal mesh until a change in the value of the quality parameter for the resulting output polygonal mesh is identified which indicates that there is a substantial loss in quality due to the mesh simplification.

In embodiments of the disclosure the candidate function is adapted in dependence upon the value of the quality parameter for the output polygonal mesh by changing the function to reduce a difference between the value of the quality parameter for the output polygonal mesh and the value of the quality parameter for the one or more of reference polygonal meshes. When the difference between the value of the quality parameter for the output polygonal mesh and the value of the quality parameter for the one or more of reference polygonal meshes indicates that the output polygonal mesh is overly simplified, the candidate function can be adjusted in a manner that yields an output polygonal mesh for which a value for the quality parameter is more similar to the value of the quality parameter for the reference polygonal meshes. This can be achieved by adjusting the candidate function to alter the amount of mesh simplification performed for a mesh having the properties of the input polygonal mesh so that the spatial deviation between a resulting output and reference polygonal meshes is reduced. When the difference between the value of the quality parameter for the output polygonal mesh and the value of the quality parameter for the one or more reference polygonal meshes indicates that the output polygonal mesh is not overly simplified (approximately equal values for the quality parameter), the candidate function can be adjusted in a manner that increases, for a mesh having the properties of the input polygonal mesh, the number of vertices removed from the mesh so that the number of removed vertices is increased to reduce the vertex redundancy of the output polygonal mesh.

In embodiments of the disclosure, the step 750 of comparing the representation of the output polygonal mesh with a representation of one or more of the reference polygonal meshes of the training data set further comprises: identifying a type of object represented by the input polygonal mesh; and selecting, for comparison with the representation of the output polygonal mesh, one or more reference polygonal meshes representing a surface of an object that is of the same type as the input polygonal mesh. For example, the data of the input polygonal mesh may represent a surface of an object such as an avatar. In this case, the training data set can be analysed to select one or more reference polygonal meshes which represent a surface of an avatar. The one or more selected reference polygonal meshes each have a representation of a surface of an avatar and the respective representations can thus be used for comparison with the representation of the output polygonal mesh to ensure that representations of the same types of object are used for comparison. Therefore, the representation of the output polygonal mesh can be compared with one or more reference polygonal meshes that provide a representation of the same type of object, and a value of the quality parameter can be assigned for the output polygonal mesh at the step 760 based on the degree of difference between the output polygonal mesh and the selected reference polygonal meshes. In some examples, the type of object represented by an input polygonal mesh and the type of object represented by a reference polygonal mesh may be indicated based on a label associated with the data for a given mesh. For example, each reference mesh of the training data set may have a corresponding label indicating a type of object which is represented by that reference mesh.

In embodiments of the disclosure, the training data set, which is accessed at the step 710, comprises data of a third polygonal mesh comprising a plurality of vertices for representing the same surface in the content, the vertex count of the reference polygonal mesh being greater then the vertex count of the third polygonal mesh, and wherein the step 750 of comparing the representation of the output polygonal mesh with the representation of one or more of the reference polygonal meshes of the training data set further comprises: comparing the representation of the output polygonal mesh with a representation of one or more of the third polygonal meshes. As discussed previously, the training data set may comprise data of a plurality of third polygonal meshes, so that each reference polygonal mesh has an associated second polygonal mesh and an associated third polygonal mesh which are both generated by adapting the reference polygonal mesh. The third polygonal mesh corresponds to an over simplified version of the reference polygonal mesh. As such, representation of the third polygonal meshes having an object type that is the same as the type of object represented by the input polygonal mesh can be selected and used for comparison with the input polygonal mesh.

Referring now to FIG. 8, in embodiments of the disclosure a method of training a system to learn a function for adapting data of an input polygonal mesh to generate data of an output polygonal mesh, comprises:

accessing (at a step 810) a training data set comprising data, for a reference, second and third polygonal mesh each comprising a plurality of vertices for representing a same surface in a content, data indicative of a vertex count for each of the reference, second and third polygonal meshes and a value of a quality parameter for each of the reference, second and third polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh and the vertex count of the reference polygonal mesh being greater than the vertex count of the third polygonal mesh, wherein the training data set comprises data of the reference, second and third polygonal meshes for a plurality of different surfaces;

obtaining (at a step 820) data of an input polygonal mesh comprising a first number of polygon surfaces, each polygon surface defined by a plurality of vertices;

assigning (at a step 830) a value of the quality parameter for the input polygonal mesh based on a comparison of a representation of the input polygonal mesh with a representation of one or more of the reference polygonal meshes of the training data set;

removing (at a step 840) a plurality of vertices from the input polygonal mesh according to a candidate function to generate data of an output polygonal mesh;

comparing (at a step 850) a representation of the output polygonal mesh with a representation of the input polygonal mesh and determining a difference between a value of the quality parameter for the output polygonal mesh and the value of the quality parameter for the input polygonal mesh based on the comparison of the representations; and adapting (at a step 860) the candidate function for removing the plurality of vertices from the input polygonal mesh in dependence upon the difference in the value of the quality parameter for the output polygonal mesh and the input polygonal mesh.

In embodiments of the disclosure a system is trained to learn a function for adapting data of an input polygonal mesh to generate data of an output polygonal mesh according to the steps illustrated in FIG. 8. Using a data set generated according to the steps illustrated in FIG. 6, the system can be trained to learn the function by obtaining data of an input polygonal mesh and determining a value of the quality parameter for the input polygonal using the quality information included in the training data set. A comparison of a representation of the input polygonal mesh with a representation of one or more of the reference polygonal meshes, second polygonal meshes and/or third polygonal meshes can be used to assign a value of the quality parameter for the input polygonal mesh. In this way, data of the input polygonal mesh can be adapted in accordance with an initial candidate function to remove a plurality of vertices from the input polygonal mesh, and the resulting output polygonal mesh can be compared with the input polygonal mesh. Specifically, a representation of the output polygonal mesh can be compared with a representation of the input polygonal mesh (for example, obtained by rendering the input and output polygonal meshes) so that a value of the quality parameter of the output polygonal mesh can be determined relative to the value of the quality parameter of the input polygonal mesh, wherein the difference between the two values is indicative of a degree of loss of quality between the input polygonal mesh and the output polygonal mesh. Therefore, the output polygonal mesh can be compared with its corresponding input polygonal mesh, and At the step 810, the training data set comprising data for a plurality of reference polygonal meshes, a plurality of second polygonal meshes and a plurality of third polygonal meshes is accessed, which provides training examples of meshes with different levels of quality and vertex redundancy. At the step 820, data is acquired for the input polygonal mesh, and at the step 830 a value of the quality parameter is assigned for the input polygonal mesh according to the training examples included in the training data set. At the step 840, the plurality of vertices are removed from the structure of the input polygonal mesh to generate the output polygonal mesh. At the step 850, the respective input and output polygonal mesh representations are compared with each other to determine whether there is a difference in quality between the input and output polygonal meshes. A difference in quality, which may occur due to the mesh simplification performed in accordance with the candidate function, is indicated according to whether the input and output polygonal meshes have different values of the quality parameter, and if the values of the quality parameter are different then a magnitude of the difference is indicative of a degree of quality loss.

By comparing a representation of the input polygonal mesh with the output polygonal mesh, the quality of the two meshes having different numbers of vertices for representing the same surface can be compared. When the output polygonal mesh has a quality value (value of the quality parameter) that is different from the quality value for the input polygonal mesh, this indicates that the output polygonal mesh has been overly simplified. As such, the candidate function can be adapted based on a magnitude of a difference between the quality values so that the amount of mesh simplification applied for a given input mesh having properties similar to those of the input polygonal mesh is reduced. By continuously performing the steps illustrated in FIG. 8, the candidate function can be iteratively adjusted, so as to learn a value for each of the one or more parameters of the candidate function which, for a given input polygonal mesh, produce an output polygonal mesh having low vertex redundancy and high-quality.

For the method illustrated in FIG. 8, the system uses the training data set to distinguish between a low quality mesh and a high quality mesh so that the input polygonal mesh data can be assigned a value for the quality parameter. The system can thus be trained to learn the properties of the candidate function that removes redundant vertices (excess vertices, which do not contribute to improving the level of quality of the mesh), from the input polygonal mesh and stops removing vertices at the point where further removal would result in loss of quality of the mesh.

For the step 850, a discriminator network trained to determine a level of quality of a given polygonal mesh based on the training data set, is used to compare the representations of the input and output polygonal meshes. The discriminator network can thus be used to compare a level of detail for a given mesh before and after mesh simplification using visual renderings of two different versions of the given mesh. A sum of the squared differences of the surface positions of the two mesh representations can be calculated, where a large value for the sum of the squared difference indicates a large spatial deviation and a small value for the sum of the squared difference indicates a small spatial deviation.

In embodiments of the disclosure, the candidate function for removing the plurality of vertices from the input polygonal mesh is adapted in dependence upon the difference in the value of the quality parameter for the output polygonal mesh and the value of the quality parameter for the input polygonal mesh to minimise the difference in the value of the quality parameter for the output polygonal mesh and the input polygonal mesh whilst maximising a total number of vertices removed from the input polygonal mesh.

Since the aim of the training method of FIG. 8 is to learn a function that reduces the number of vertices whilst preserving mesh quality by removing redundant vertices, the adaptation of the candidate function is performed on the basis of a function that includes a measure of a difference in quality between the input and output meshes, and a measure of the total number of vertices included in the output mesh. Therefore the process of learning the function can be performed by adapting the candidate function in a manner that minimises a value given by the equation 1:

$$\Sigma_{i=0}{}^{n}[(\text{outputmesh})_i-(\text{inputmesh})_i]^2+[\text{number of outputmesh vertices} \times \text{simplification parameter}],$$

where the terms outputmesh_i and inputmesh_i represent surface positions for the output polygonal mesh and the input polygonal mesh, respectively. The spatial difference between the two polygonal meshes is thus calculated for a set of positions i=0 to n, and the calculated differences are squared and summed to calculate a value D ($D=\Sigma_{i=0}{}^{n}[(\text{outputmesh})_i-(\text{inputmesh})_i]^2$)) which indicates a degree of spatial deviation between the two meshes.

By adapting the candidate function in a manner that minimises the value calculated according to equation 1, the trade off between a reduction in the number of vertices and a loss of quality can be controlled. The discriminator network can be used to compare the surface positions of the two mesh representations and to calculate a sum of the squared differences of the surface positions of the two mesh representations to calculate the value D indicative of a total difference between the two meshes. A large value of D indicates that the surface positions of the output polygonal mesh differ significantly from the surface positions of the input polygonal mesh, which indicates that there has been a loss of quality due to the mesh reduction. Similarly, a small value of D indicates that the surface positions of the output polygonal mesh are the same as, or similar to, the surface positions of the input polygonal mesh, which indicates that there has not been a substantial loss of quality due to the mesh reduction. It is therefore desirable to adapt the candidate function in a manner that yields a small value for D when comparing the input and output polygonal meshes.

At the same time as maintaining a small value for D the input and output meshes, in order to minimise the value calculated according to equation 1, the number of vertices of the output mesh should be made as small as possible. However, whilst is possible to remove redundant vertices with little or no loss in quality of the polygonal mesh, a situation arises where removal of vertices from the mesh begins to result in deterioration of the quality of the mesh. Consequently, by adapting the candidate function so as to minimise the value calculated by the equation 1, the candidate function can be adapted so as to generate data of an output polygonal mesh having a quality that is substantially the same as the quality of the input polygonal mesh but with the redundant vertices having been removed.

The simplification parameter included in equation 1 may be set as a constant value to appropriately scale the number of vertices of the output polygonal mesh with respect to the value D corresponding to the degree of spatial deviation between the input and output meshes. Alternatively, in some examples the value of the simplification parameter included in equation 1 can be adjusted by a user to alter a weighting associated with the number of vertices of the output polygonal mesh. In this way, the user can select a value for the simplification parameter in order to control the trade off between the level of detail of the output polygonal mesh and the number of vertices of the output polygonal mesh. For example, the user can increase a value for the simplification parameter to increase the weighting of the term "number of outputmesh vertices×simplification parameter" in equation 1, which will result in decreasing the total number of vertices that are removed from the input polygonal mesh (in other words, for a given input polygonal mesh the output polygonal mesh will have a greater number of vertices). Alternatively, the user may decrease the value of the simplification parameter to decrease the weighting of the term "number of outputmesh vertices×simplification parameter", which will result in increasing the number of vertices that are removed from the input polygonal mesh (in other words, for a given input polygonal mesh the output polygonal mesh will have a smaller number of vertices).

Figure 9:
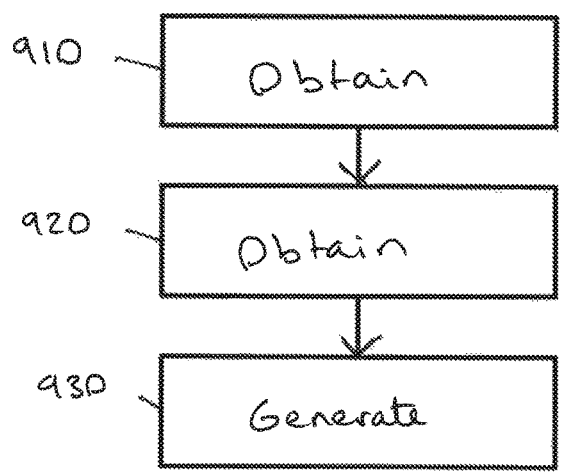
FIG. 9 is a schematic flowchart illustrating a method of adapting data of an input polygonal mesh to generate data of an output polygonal mesh using a trained system.

Referring now to FIG. 9, in embodiments of the disclosure a method of adapting data of an input polygonal mesh to generate data of an output polygonal mesh using a system trained according to any of the previously disclosed techniques, comprises obtaining (at a step 910) data of an input polygonal mesh comprising a first number of polygon surfaces, each polygon surface defined by a plurality of vertices;

obtaining (at a step 920) data indicative of a function for removing a plurality of vertices from the input polygonal mesh; and generating (at a step 930) data of an output polygonal mesh by removing a plurality of vertices from the input polygonal mesh according to the function, the output polygonal mesh having a second number of polygon surfaces, the second number of polygon surfaces being smaller than the first number of polygon surfaces.

Embodiments of the disclosure provide computer software, which when executed by a computer, causes the computer to carry out any of the methods discussed above.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practised otherwise than as specifically described herein.

Figure 10:
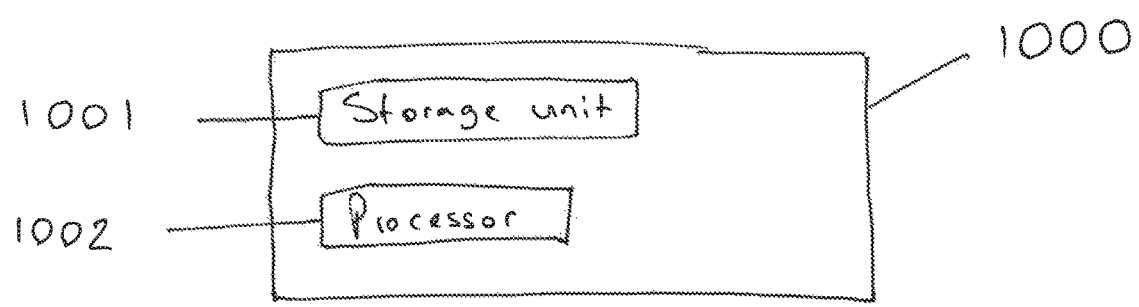
FIG. 10 schematically illustrates an apparatus to perform the methods of any one of FIGS. 6-9.

Referring now to FIG. 10, in embodiments of the disclosure an apparatus 1000 comprises a storage unit 1001 configured to store a data set generated according to the steps illustrated in FIG. 5 or FIG. 6 and a processor 1002 configured to perform the steps illustrated in FIG. 5 or FIG. 6. For example, the apparatus 1000 may take the form of a general purpose computing device comprising a central processing unit (CPU) and a storage medium. The apparatus may be provided as part of a server or a games console which collects data indicative of reference meshes from different devices which can be used to generate the data set for training an artificial intelligence. The method(s) described above may be carried out on conventional hardware suitably adapted as applicable by software instruction or by the inclusion or substitution of dedicated hardware.

In embodiments of the disclosure, an apparatus 1000 to generate a data set for training a processor to generate data of a polygonal mesh by adapting data of an input polygonal mesh, comprises circuitry to:

obtain data of a plurality of reference polygonal meshes for use in rendering a content, each reference polygonal mesh comprising a plurality of vertices for representing a surface in the content;

determine a vertex count of each of the reference polygonal meshes;

generate a second polygonal mesh by adding a predetermined number of vertices to the reference polygonal mesh;

compare a representation of the second polygonal mesh with a representation of the reference polygonal mesh;

assign a first value a quality parameter to the reference polygonal mesh and to assign a second value of the quality parameter to the second polygonal mesh based on the comparison of the representations, the value of the quality parameter for a given polygonal mesh indicative of a degree of difference between a representation of the given polygonal mesh and a representation of the reference polygonal mesh; and generate a data set comprising data indicative of the vertex count for the reference and second polygonal meshes and the value of the quality parameters for the reference and second polygonal meshes.

In embodiments of the disclosure, the apparatus 1000 is further configured to:

generate a third polygonal mesh by removing a predetermined number of vertices from the reference polygonal mesh;

compare a representation of the third polygonal mesh with the representation of the reference polygonal mesh;

assign a third value of the quality parameter to the third polygonal mesh based on the comparison of the representations; and generate the data set further comprising data indicative of the vertex count for the third polygonal mesh and the value of the quality parameter for the third polygonal mesh.

Once the data set for training is generated, an artificial intelligence can be trained to learn a function for adapting data of an input polygonal mesh based on the relationships between the polygonal meshes included in the data set, as discussed previously. A system may comprise a neural network architecture trained to learn a function based on the data set generated in accordance with the above techniques.

In embodiments of the disclosure a system configured to learn a function for adapting data of an input polygonal mesh to generate data of an output polygonal mesh, comprises circuitry configured to:

access a training data set comprising, for a reference polygonal mesh and a second polygonal mesh each comprising a plurality of vertices for representing a same surface, data indicative of a vertex count of each of the reference and the second polygonal meshes and a value of a quality parameter for each of the reference and the second polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh, wherein the training data set comprises data of the reference and second polygonal meshes for a plurality of different surfaces;

analyse the data for the second polygonal meshes and the reference polygonal meshes of the training data set to determine a candidate function for removing a plurality of vertices from the second polygonal meshes to generate the reference polygonal meshes;

obtain data of an input polygonal mesh comprising a first number of polygon surfaces, each polygon surface defined by a plurality of vertices;

adapt the data of the input polygonal mesh by removing a plurality of vertices from the input polygonal mesh according to the candidate function to generate data of an output polygonal mesh;

compare a representation of the output polygonal mesh with a representation of one or more of the reference polygonal meshes of the training data set;

assign a value of a quality parameter for the output polygonal mesh based on the comparison of the representations; and adapt the candidate function in dependence upon the value of the quality parameter for the output polygonal mesh.

In embodiments of the disclosure the system is configured to:

identify a type of object represented by the input polygonal mesh; and select, for comparison with the representation of the output polygonal mesh, one or more reference polygonal meshes representing a surface of an object that is of the same type as the input polygonal mesh.

In embodiments of the disclosure a system configured to learn a function for adapting data of an input polygonal mesh to generate data of an output polygonal mesh, comprises circuity configured to:

access a training data set comprising data, for a reference, second and third polygonal mesh each comprising a plurality of vertices for representing a same surface in a content, data indicative of a vertex count for each of the reference, second and third polygonal meshes and a value of a quality parameter for each of the reference, second and third polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh and the vertex count of the reference polygonal mesh being greater than the vertex count of the third polygonal mesh, wherein the training data set comprises data of the reference, second and third polygonal meshes for a plurality of different surfaces;

obtain data of an input polygonal mesh comprising a first number of polygon surfaces, each polygon surface defined by a plurality of vertices;

assign a value of the quality parameter for the input polygonal mesh based on a comparison of a representation of the input polygonal mesh with a representation of one or more of the reference polygonal meshes of the training data set;

remove a plurality of vertices from the input polygonal mesh according to a candidate function to generate data of an output polygonal mesh;

compare a representation of the output polygonal mesh with a representation of the input polygonal mesh and determining a difference between a value of the quality parameter for the output polygonal mesh and the value of the quality parameter for the input polygonal mesh based on the comparison of the representations; and adapt the candidate function for removing the plurality of vertices from the input polygonal mesh in dependence upon the difference in the value of the quality parameter for the output polygonal mesh and the input polygonal mesh.

In embodiments of the disclosure a system trained according to a method of any of the embodiments of the present disclosure, comprises circuitry configured to:

obtain data of an input polygonal mesh comprising a first number of polygon surfaces, each polygon surface defined by a plurality of vertices;

obtain data indicative of a function trained to remove a plurality of vertices from the input polygonal mesh; and generate data of an output polygonal mesh by removing a plurality of vertices from the input polygonal mesh according to the function, the output polygonal mesh having a second number of polygon surfaces, the second number of polygon surfaces being smaller than the first number of polygon surfaces.

It will be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of training a system to learn a function for adapting data of an input polygonal mesh to generate data of an output polygonal mesh, comprising:

accessing a training data set comprising, for a reference polygonal mesh and a second polygonal mesh each comprising a plurality of vertices for representing a same surface, data indicative of a vertex count of each of the reference and the second polygonal meshes and a value of a quality parameter for each of the reference and the second polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh, wherein the training data set comprises data of the reference and second polygonal meshes for a plurality of different surfaces;

analysing the data for the second polygonal meshes and the reference polygonal meshes of the training data set to determine a candidate function for removing a plurality of vertices from the second polygonal meshes to generate the reference polygonal meshes;

obtaining data of an input polygonal mesh comprising a first number of polygon surfaces, each polygon surface defined by a plurality of vertices;

adapting the data of the input polygonal mesh by removing a plurality of vertices from the input polygonal mesh according to the candidate function to generate data of an output polygonal mesh;

comparing a representation of the output polygonal mesh with a representation of one or more of the reference polygonal meshes of the training data set;

assigning a value of a quality parameter for the output polygonal mesh based on the comparison of the representations; and adapting the candidate function in dependence upon the value of the quality parameter for the output polygonal mesh.

2. The method of training a system according to claim 1, further comprising, before any of the previously recited steps:

generating a data set for training the system to generate data of a polygonal mesh by adapting data of an input polygonal mesh by carrying out steps including:

obtaining data of a plurality of reference polygonal meshes for use in rendering a content, each reference polygonal mesh comprising a plurality of vertices for representing a surface in the content;

for each reference polygonal mesh:

determining a vertex count of the reference polygonal mesh;

generating a second polygonal mesh by adding a predetermined number of vertices to the reference polygonal mesh;

comparing a representation of the second polygonal mesh with a representation of the reference polygonal mesh;

assigning a first value of a quality parameter to the reference polygonal mesh, and assigning a second value of the quality parameter to the second polygonal mesh based on the comparison of the representations, the value of the quality parameter for a given polygonal mesh indicative of a degree of difference between a representation of the given polygonal mesh and a representation of the reference polygonal mesh; and generating a data set comprising data indicative of the vertex count for the reference and second polygonal meshes and the value of the quality parameters for the reference and second polygonal meshes.

3. A method according to claim 2, comprising:

generating a third polygonal mesh by removing a predetermined number of vertices from the reference polygonal mesh;

comparing a representation of the third polygonal mesh with the representation of the reference polygonal mesh;

assigning a third value of the quality parameter to the third polygonal mesh based on the comparison of the representations; and generating the data set further comprising data indicative of the vertex count for the third polygonal mesh and the value of the quality parameter for the third polygonal mesh.

4. A method according to claim 3, wherein the data generated for the third polygonal mesh corresponds to a ground truth for an over simplified polygonal mesh.

5. A method according to claim 2, wherein the data generated for the second polygonal mesh corresponds to a ground truth for a polygonal mesh having a higher-level of vertex redundancy and the data generated for the first polygonal mesh corresponds to a ground truth for a polygonal mesh having a lower-level of vertex redundancy.

6. A method according to claim 2, wherein the second polygonal mesh is generated using Catmull-Clark surface subdivision.

7. A method according to claim 1, wherein the candidate function is adapted in dependence upon the value of the quality parameter for the output polygonal mesh by changing the function to reduce a difference between the value of the quality parameter for the output polygonal mesh and the value of the quality parameter for the one or more of reference polygonal meshes.

8. A method according to claim 1, wherein the step of comparing further comprises:

identifying a type of object represented by the input polygonal mesh; and selecting, for comparison with the representation of the output polygonal mesh, one or more reference polygonal meshes representing a surface of an object that is of the same type as the input polygonal mesh.

9. A method according to claim 1, wherein the training data set comprises data of a third polygonal mesh comprising a plurality of vertices for representing the same surface in the content, the vertex count of the reference polygonal mesh being greater then the vertex count of the third polygonal mesh, and wherein the step of comparing further comprises:

comparing the representation of the output polygonal mesh with a representation of one or more of the third polygonal meshes.

10. A method of training a system to learn a function for adapting data of an input polygonal mesh to generate data of an output polygonal mesh, comprising:

accessing a training data set comprising data, for a reference, second and third polygonal mesh each comprising a plurality of vertices for representing a same surface in a content, data indicative of a vertex count for each of the reference, second and third polygonal meshes and a value of a quality parameter for each of the reference, second and third polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh and the vertex count of the reference polygonal mesh being greater than the vertex count of the third polygonal mesh, wherein the training data set comprises data of the reference, second and third polygonal meshes for a plurality of different surfaces;

obtaining data of an input polygonal mesh comprising a first number of polygon surfaces, each polygon surface defined by a plurality of vertices;

assigning a value of the quality parameter for the input polygonal mesh based on a comparison of a representation of the input polygonal mesh with a representation of one or more of the reference polygonal meshes of the training data set;

removing a plurality of vertices from the input polygonal mesh according to a candidate function to generate data of an output polygonal mesh;

comparing a representation of the output polygonal mesh with a representation of the input polygonal mesh and determining a difference between a value of the quality parameter for the output polygonal mesh and the value of the quality parameter for the input polygonal mesh based on the comparison of the representations; and adapting the candidate function for removing the plurality of vertices from the input polygonal mesh in dependence upon the difference in the value of the quality parameter for the output polygonal mesh and the input polygonal mesh.

11. A method according to claim 10, wherein the candidate function for removing the plurality of vertices from the input polygonal mesh is adapted in dependence upon the difference in the value of the quality parameter for the output polygonal mesh and the value of the quality parameter for the input polygonal mesh to minimise the difference in the value of the quality parameter for the output polygonal mesh and the input polygonal mesh whilst maximising a total number of vertices removed from the input polygonal mesh.

12. A method according to claim 10, comprising:
adapting data of an input polygonal mesh to generate data of an output polygonal mesh by carrying out steps including:
obtaining data of an input polygonal mesh comprising a first number of polygon surfaces, each polygon surface defined by a plurality of vertices;
obtaining data indicative of a function for removing a plurality of vertices from the input polygonal mesh; and
generating data of an output polygonal mesh by removing a plurality of vertices from the input polygonal mesh according to the function, the output polygonal mesh having a second number of polygon surfaces, the second number of polygon surfaces being smaller than the first number of polygon surfaces.

13. A non-transitory, computer-readable storage medium containing computer software which, when executed by a computer, causes the computer to train a system to learn a function for adapting data of an input polygonal mesh to generate data of an output polygonal mesh by carrying out actions, comprising:
accessing a training data set comprising data, for a reference, second and third polygonal mesh each comprising a plurality of vertices for representing a same surface in a content, data indicative of a vertex count for each of the reference, second and third polygonal meshes and a value of a quality parameter for each of the reference, second and third polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh and the vertex count of the reference polygonal mesh being greater than the vertex count of the third polygonal mesh, wherein
the training data set comprises data of the reference, second and third polygonal meshes for a plurality of different surfaces;
obtaining data of an input polygonal mesh comprising a first number of polygon surfaces, each polygon surface defined by a plurality of vertices;
assigning a value of the quality parameter for the input polygonal mesh based on a comparison of a representation of the input polygonal mesh with a representation of one or more of the reference polygonal meshes of the training data set;
removing a plurality of vertices from the input polygonal mesh according to a candidate function to generate data of an output polygonal mesh;
comparing a representation of the output polygonal mesh with a representation of the input polygonal mesh and determining a difference between a value of the quality parameter for the output polygonal mesh and the value of the quality parameter for the input polygonal mesh based on the comparison of the representations; and
adapting the candidate function for removing the plurality of vertices from the input polygonal mesh in dependence upon the difference in the value of the quality parameter for the output polygonal mesh and the input polygonal mesh.

14. A system configured to learn a function for adapting data of an input polygonal mesh to generate data of an output polygonal mesh, comprising circuitry configured to:
access a training data set comprising, for a reference polygonal mesh and a second polygonal mesh each comprising a plurality of vertices for representing a same surface, data indicative of a vertex count of each of the reference and the second polygonal meshes and a value of a quality parameter for each of the reference and the second polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh, wherein
the training data set comprises data of the reference and second polygonal meshes for a plurality of different surfaces;
analyse the data for the second polygonal meshes and the reference polygonal meshes of the training data set to determine a candidate function for removing a plurality of vertices from the second polygonal meshes to generate the reference polygonal meshes;
obtain data of an input polygonal mesh comprising a first number of polygon surfaces, each polygon surface defined by a plurality of vertices;
adapt the data of the input polygonal mesh by removing a plurality of vertices from the input polygonal mesh according to the candidate function to generate data of an output polygonal mesh;
compare a representation of the output polygonal mesh with a representation of one or more of the reference polygonal meshes of the training data set;
assign a value of a quality parameter for the output polygonal mesh based on the comparison of the representations; and
adapt the candidate function in dependence upon the value of the quality parameter for the output polygonal mesh.

15. A system according to claim 14, further comprising:
apparatus to generate a data set for training a processor to generate data of a polygonal mesh by adapting data of an input polygonal mesh, the apparatus comprising circuitry to:
obtain data of a plurality of reference polygonal meshes for use in rendering a content, each reference polygonal mesh comprising a plurality of vertices for representing a surface in the content;
determine a vertex count of each of the reference polygonal meshes;
generate a second polygonal mesh by adding a predetermined number of vertices to the reference polygonal mesh;
compare a representation of the second polygonal mesh with a representation of the reference polygonal mesh;
assign a first value a quality parameter to the reference polygonal mesh and to assign a second value of the quality parameter to the second polygonal mesh based on the comparison of the representations, the value of the quality parameter for a given polygonal mesh indicative of a degree of difference between a representation of the given polygonal mesh and a representation of the reference polygonal mesh; and generate a data set comprising data indicative of the vertex count for the reference and second polygonal meshes and the value of the quality parameters for the reference and second polygonal meshes.

16. A system according to claim 15, wherein the circuitry is further configured to:

generate a third polygonal mesh by removing a predetermined number of vertices from the reference polygonal mesh;

compare a representation of the third polygonal mesh with the representation of the reference polygonal mesh;

assign a third value of the quality parameter to the third polygonal mesh based on the comparison of the representations; and generate the data set further comprising data indicative of the vertex count for the third polygonal mesh and the value of the quality parameter for the third polygonal mesh.

17. A system according to claim 14, further configured to:

identify a type of object represented by the input polygonal mesh; and select, for comparison with the representation of the output polygonal mesh, one or more reference polygonal meshes representing a surface of an object that is of the same type as the input polygonal mesh.

18. A system configured to learn a function for adapting data of an input polygonal mesh to generate data of an output polygonal mesh, comprising circuitry configured to:

access a training data set comprising data, for a reference, second and third polygonal mesh each comprising a plurality of vertices for representing a same surface in a content, data indicative of a vertex count for each of the reference, second and third polygonal meshes and a value of a quality parameter for each of the reference, second and third polygonal meshes, the quality parameter for a given polygonal mesh indicative of a degree of difference between a representation of the given polygonal mesh and a representation of the reference polygonal mesh, the vertex count of the second polygonal mesh being greater than the vertex count of the reference polygonal mesh and the vertex count of the reference polygonal mesh being greater than the vertex count of the third polygonal mesh, wherein the training data set comprises data of the reference, second and third polygonal meshes for a plurality of different surfaces;

obtain data of an input polygonal mesh comprising a first number of polygon surfaces, each polygon surface defined by a plurality of vertices;

assign a value of the quality parameter for the input polygonal mesh based on a comparison of a representation of the input polygonal mesh with a representation of one or more of the reference polygonal meshes of the training data set;

remove a plurality of vertices from the input polygonal mesh according to a candidate function to generate data of an output polygonal mesh;

compare a representation of the output polygonal mesh with a representation of the input polygonal mesh and determining a difference between a value of the quality parameter for the output polygonal mesh and the value of the quality parameter for the input polygonal mesh based on the comparison of the representations; and adapt the candidate function for removing the plurality of vertices from the input polygonal mesh in dependence upon the difference in the value of the quality parameter for the output polygonal mesh and the input polygonal mesh.

19. A system according to claim 18, comprising circuitry configured to:

obtain data of an input polygonal mesh comprising a first number of polygon surfaces, each polygon surface defined by a plurality of vertices;

obtain data indicative of a function trained to remove a plurality of vertices from the input polygonal mesh; and generate data of an output polygonal mesh by removing a plurality of vertices from the input polygonal mesh according to the function, the output polygonal mesh having a second number of polygon surfaces, the second number of polygon surfaces being smaller than the first number of polygon surfaces.

* * * * *